US008177621B2

(12) United States Patent
Jaffe et al.

(10) Patent No.: US 8,177,621 B2
(45) Date of Patent: May 15, 2012

(54) GAMING MACHINE WITH SKILL-BASED COMPENSATION

(75) Inventors: Joel R. Jaffe, Glenview, IL (US); Noel S. Steere, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 62 days.

(21) Appl. No.: 11/433,346

(22) Filed: May 12, 2006

(65) Prior Publication Data

US 2006/0258434 A1 Nov. 16, 2006

Related U.S. Application Data

(60) Provisional application No. 60/680,753, filed on May 13, 2005.

(51) Int. Cl.

| | |
|---|---|
| ***A63F 9/24*** | (2006.01) |
| ***A63F 13/00*** | (2006.01) |
| ***A63F 1/00*** | (2006.01) |
| ***A63F 1/18*** | (2006.01) |
| ***G06F 17/00*** | (2006.01) |
| ***G06F 19/00*** | (2011.01) |
| ***A63B 71/00*** | (2006.01) |

(52) U.S. Cl. ........... 463/20; 463/16; 463/25; 273/138.1; 273/139; 273/143 R

(58) Field of Classification Search .................... 463/16, 463/20, 25; 273/138.1, 139, 143 R
See application file for complete search history.

(56) References Cited

U.S. PATENT DOCUMENTS

| | | | | |
|---|---|---|---|---|
| 5,401,023 | A * | 3/1995 | Wood | 463/13 |
| 6,110,043 | A * | 8/2000 | Olsen | 463/27 |
| 6,203,429 | B1 * | 3/2001 | Demar et al. | 463/20 |
| 6,309,300 | B1 * | 10/2001 | Glavich | 463/26 |
| 6,390,473 | B1 | 5/2002 | Vancura et al. | |
| 6,435,511 | B1 | 8/2002 | Vancura et al. | |
| 6,554,283 | B2 | 4/2003 | Vancura et al. | |
| 6,692,005 | B2 | 2/2004 | Vancura et al. | |
| 6,733,386 | B2 * | 5/2004 | Cuddy et al. | 463/17 |
| 6,761,632 | B2 | 7/2004 | Bansemer et al. | |
| 6,837,788 | B2 * | 1/2005 | Cannon | 463/16 |
| 7,001,273 | B2 * | 2/2006 | Baerlocher | 463/20 |
| 7,037,191 | B2 * | 5/2006 | Rodgers et al. | 463/16 |
| 7,037,195 | B2 * | 5/2006 | Schneider et al. | 463/25 |
| 7,074,127 | B2 * | 7/2006 | Cuddy et al. | 463/20 |
| 7,235,011 | B2 * | 6/2007 | Randall et al. | 463/25 |
| 7,303,469 | B2 * | 12/2007 | Kaminkow | 463/20 |
| 2002/0027323 | A1 | 3/2002 | Vancura et al. | |
| 2002/0190471 | A1 | 12/2002 | Vancura et al. | |
| 2003/0064780 | A1 * | 4/2003 | Baerlocher et al. | 463/20 |
| 2003/0193139 | A1 | 10/2003 | Vancura et al. | |
| 2003/0199312 | A1 | 10/2003 | Walker et al. | |
| 2004/0048644 | A1 * | 3/2004 | Gerrard et al. | 463/16 |
| 2005/0164779 | A1 * | 7/2005 | Okuniewicz | 463/25 |
| 2006/0089196 | A1 * | 4/2006 | Parham et al. | 463/27 |

* cited by examiner

*Primary Examiner* — Peter DungBa Vo
*Assistant Examiner* — Wei Li
(74) *Attorney, Agent, or Firm* — Nixon Peabody LLP

(57) ABSTRACT

A gaming machine for conducting a wagering game includes a basic wagering game and a bonus wagering game. The bonus wagering game has a skill-based component that involves skill and a random component where no skill is involved. The gaming machine uses the random component to compensate players for a lack of optimal play during the skill-based component. The compensation is provided in a manner that appears random to the players to prevent the players from intentionally playing for the compensation.

16 Claims, 12 Drawing Sheets

GAMING MACHINE WITH SKILL-BASED COMPENSATION

CROSS REFERENCE TO RELATED APPLICATION

This application for patent claims priority to, and hereby incorporates by reference, U.S. Provisional Application Ser. No. 60/680,753, entitled "Gaming Machine With Skill-Based Compensation," filed May 13, 2005 with the United States Patent and Trademark Office.

COPYRIGHT

A portion of the disclosure of this patent document contains material that is subject to copyright protection. The copyright owner has no objection to the facsimile reproduction by anyone of the patent disclosure as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having skill-based compensation.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus wagering game may comprise any type of game, either similar to or completely different from the basic wagering game, which is entered upon the occurrence of a selected event or outcome in the basic wagering game. Generally, bonus wagering games provide a greater expectation of winning than the basic wagering game and may also be accompanied by more attractive or unusual video displays and/or audio. Bonus wagering games may additionally award players with "progressive jackpot" awards that are funded, at least in part, by a percentage of coin-in from the gaming machine or a plurality of participating gaming machines. Because the bonus wagering game concept offers tremendous advantages in player appeal and excitement relative to other known games, and because such games are attractive to both players and operators, there is a continuing need to develop gaming machines with new types of bonus wagering games to satisfy the demands of players and operators.

Skill-based games are often attractive to player. These skill-based games tend to provide a greater degree of player involvement and interaction because they require the player to carefully consider his or her actions rather than simply make arbitrary selections. In general, there are three types of skill-based games: games that involve the use of strategy, games that rely on the player's past experiences and knowledge, and games that require hand-eye coordination. Each type has its advantages and drawbacks.

In the strategy-based game, there are usually clear rules from which the player can infer the most optimal choices. An example of this type is Tic-Tac-Toe, where playing in certain squares first can guarantee the player at least a draw. In the experience or knowledge-based game, the player is required to make decisions without knowing which choices lead to what outcomes. An example of this type is a game in which the player must decide whether to redeem an award worth a certain credit amount or try for another worth potentially more, but also potentially less. The player's past knowledge of success has an influence on his or her future selections. In the hand-eye coordination type of game, the player uses reflex and manual dexterity to try and achieve the best results. An example of such a game is "Pong," where the player controls the movement of a computerized paddle to deflect a bouncing ball.

Wagering games are typically designed to avoid elements of skill because gaming regulations prohibit giving certain players an advantage. Such skill-based games often end up with some players using less than the most optimal strategy or not making the best decisions. As a result, these players wind up with less than their expected share of winnings, thus producing a less than desirable gaming experience.

Accordingly, what is needed is a gaming machine having a skill-based game to attract players, but which compensates players who are using less-than-optimal strategy or who are not making the best decisions. In particular, what is needed is a gaming machine that is capable of performing the compensation in such a way that players would not easily suspect they are being compensated.

SUMMARY OF THE INVENTION

According to one aspect of the invention, a gaming machine for conducting a wagering game includes a value input device for accepting a wager from a player at the gaming machine and a display unit for displaying a wagering game on the gaming machine. The wagering game has an outcome that is randomly selected from a plurality of outcomes, the plurality of outcomes including a special-event outcome. In response to the randomly-selected outcome being the special-event outcome, the display unit displays a special event having a skill-based component and a random component. The skill-based component is playable by the player to achieve an optimal strategy and a non-optimal strategy. The random component compensates the player for achieving a non-optimal strategy in the skill-based component.

According to another aspect of the invention, a method of conducting a wagering game on a gaming machine comprises accepting a wager input from a player at the gaming machine. The wager input initiates a wagering game in which an outcome is randomly selected from a plurality of outcomes, the plurality of outcomes including a special-event outcome. The method further comprises displaying a special event upon occurrence of the special-event outcome as the randomly-selected outcome, the special event including a skill-based component and a random component. The random component is controlled to compensate the player for achieving a non-optimal strategy in the skill-based component.

According to still another aspect of the invention, a method of conducting a wagering game on a gaming machine comprises accepting a wager input from a player at the gaming machine. The wager input initiates a wagering game in which an outcome is randomly selected from a plurality of outcomes, the wagering game having a skill-based component and a random component. The method further comprises displaying the skill-based component for play by the player, the skill-based component being playable by the player to achieve an optimal strategy and a non-optimal strategy. The random component is controlled to compensate the player for achieving a non-optimal strategy in the skill-based component.

According to yet another aspect of the invention, a computer readable storage medium is encoded with instructions for directing a gaming machine to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1:
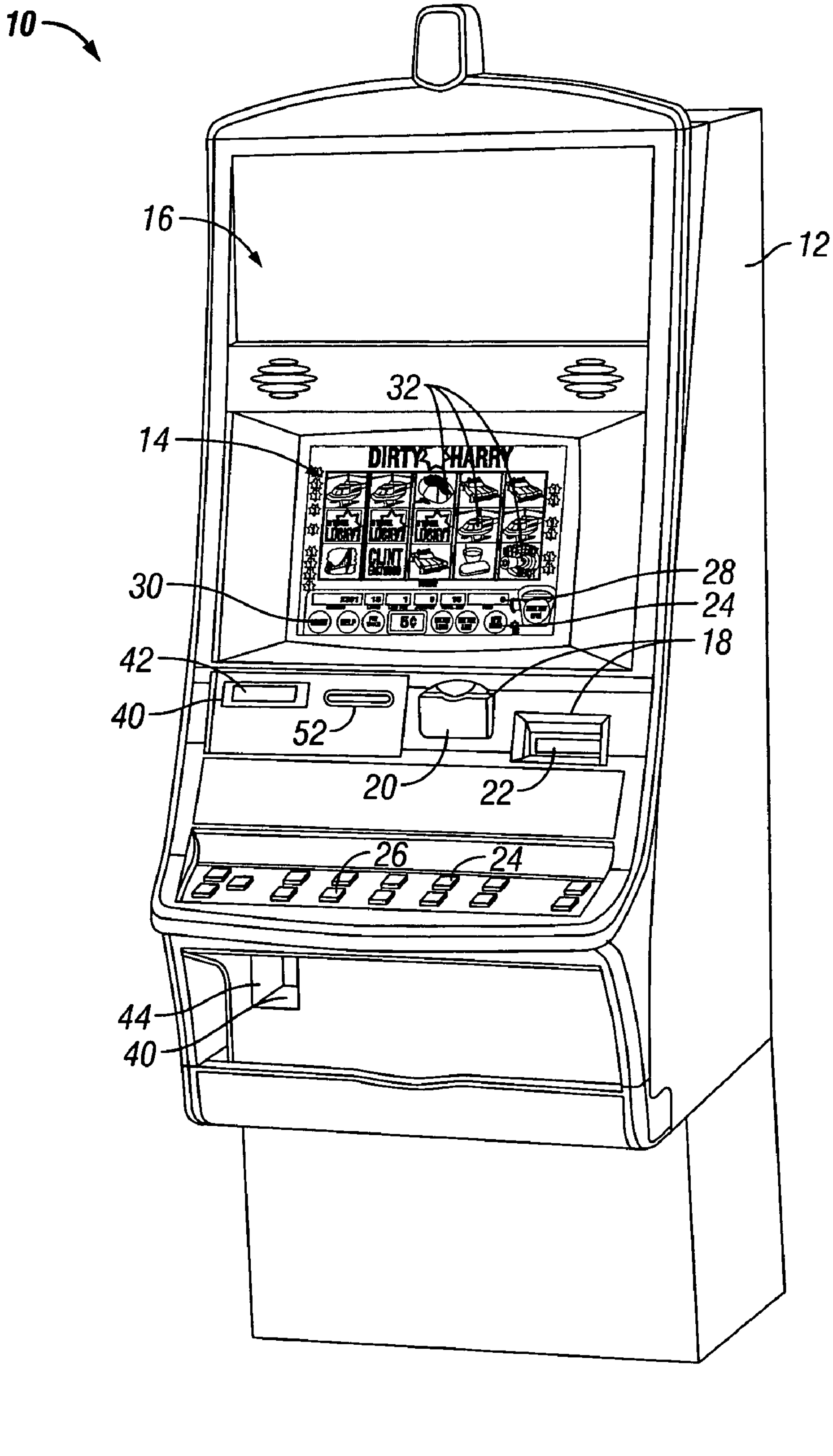
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 similar to the ones used in gaming establishments such as casinos is shown. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus wagering game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic wagering game consists of a plurality of symbols arranged in an array, and includes at least one payline 32 that indicates one or more outcomes of the basic wagering game. Such outcomes are randomly selected in response to the wager by the player. At least one of the plurality of randomly-selected outcomes may be a start-bonus outcome, which can include any variations of symbols or symbol combinations triggering a bonus wagering game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
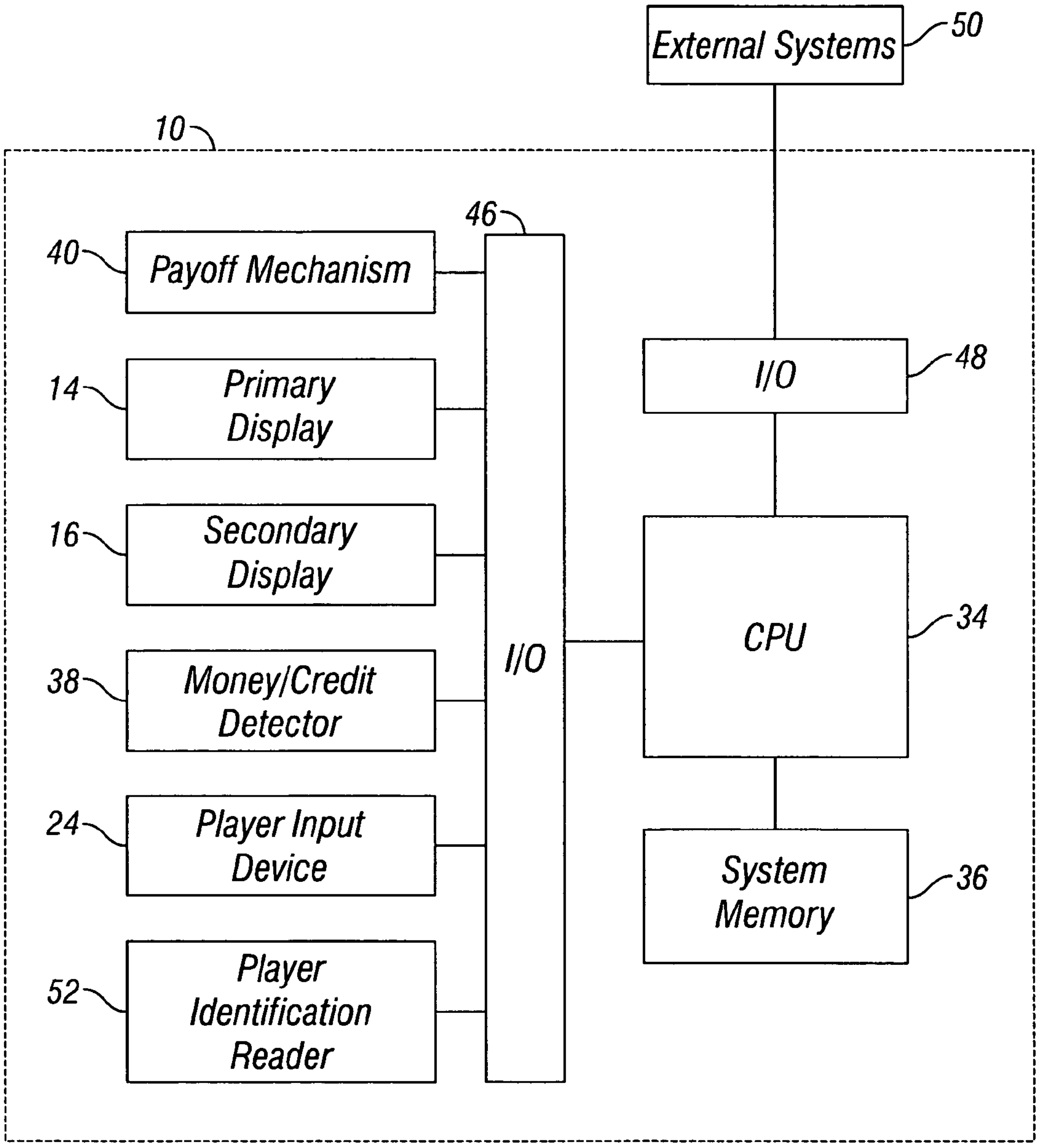
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic wagering game or the bonus wagering game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
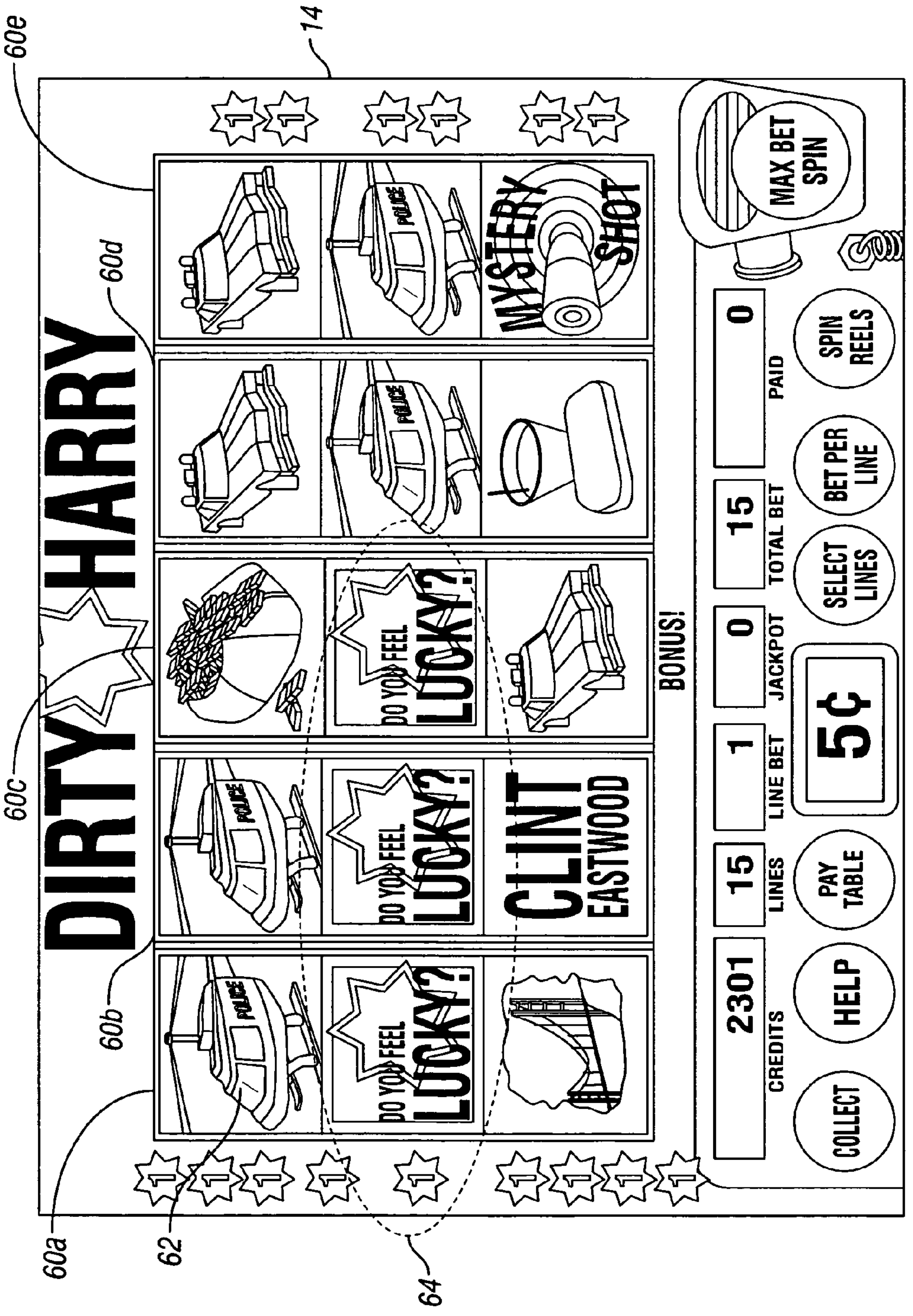
FIG. 3 illustrates a basic wagering game that may be conducted on the gaming machine.

Turning now to FIG. 3, a close-up view of the primary display 14 is shown. Displayed on the primary display 14 is a basic wagering game which, in this embodiment, is a multi-line video slot machine having five reels 60*a*, 60*b*, 60*c*, 60*d*, and 60*e* and a wide-area progressive based on the Clint Eastwood movie "Dirty Harry." Each of the five reels 60*a-e* has a plurality of reel symbols 62 that are related to the "Dirty Harry" movie, including a "Do You Feel Lucky" symbol. Only three symbols per reel are visible at any given time, resulting in a total of 15 symbols displayed on the primary display 14. Three or more of the "Do You Feel Lucky" symbols 62 lining up on any active payline, as shown at 64, constitutes a start-bonus outcome. Of course, other symbols 62 besides the "Do You Feel Lucky" symbol may be used for the start-bonus outcome without departing from the scope of the invention.

Figure 4:
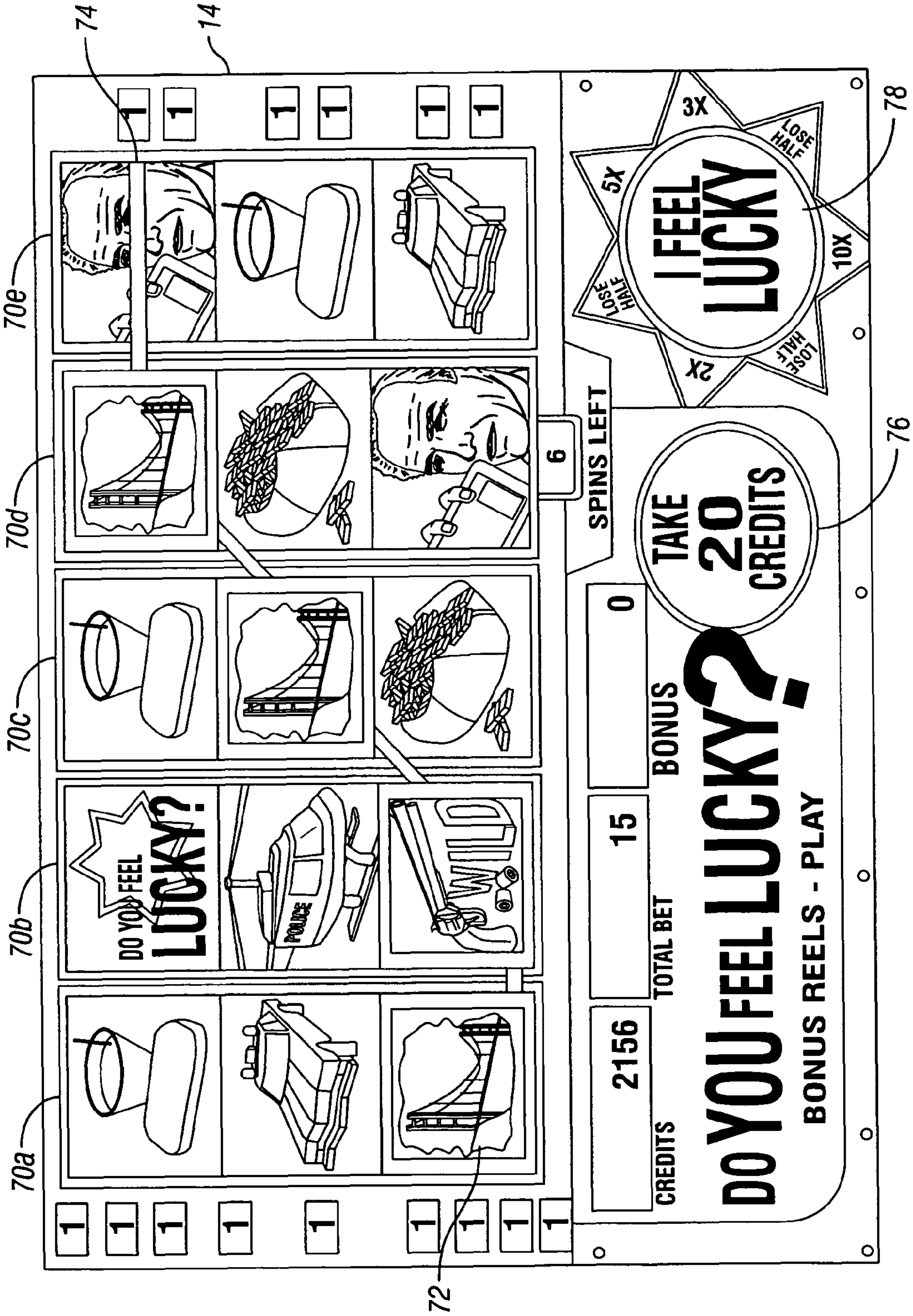
FIG. 4 illustrates a bonus wagering game that may be conducted on the gaming machine according to one embodiment of the invention.

Upon the randomly-selected outcome being the start-bonus outcome, the basic wagering game transitions to a bonus wagering game on the primary display 14. It is also possible, of course, for the bonus wagering game to be displayed on the secondary display 16 instead. An example of such a bonus wagering game is shown in FIG. 4, where the bonus wagering game is a free-spins game. Like the basic wagering game, the bonus wagering game in this embodiment is also a multi-line video slot machine having five reels 70*a*, 70*b*, 70*c*, 70*d*, and 70*e* based on the "Dirty Harry" movie. Each of the five reels 70*a-e* has a plurality of reel symbols 72 that together represent or indicate the outcome of the bonus wagering game. When the same reel symbol 72 lines up on one of the active paylines 74, a credit amount is awarded to the player. At the end of the free spins, the player is given a choice between taking the credit amount (e.g., 20 credits) by selecting the "Take Credit" option 76, or multiplying the winnings by selecting the "I Feel Lucky" option 78.

Figure 5A:
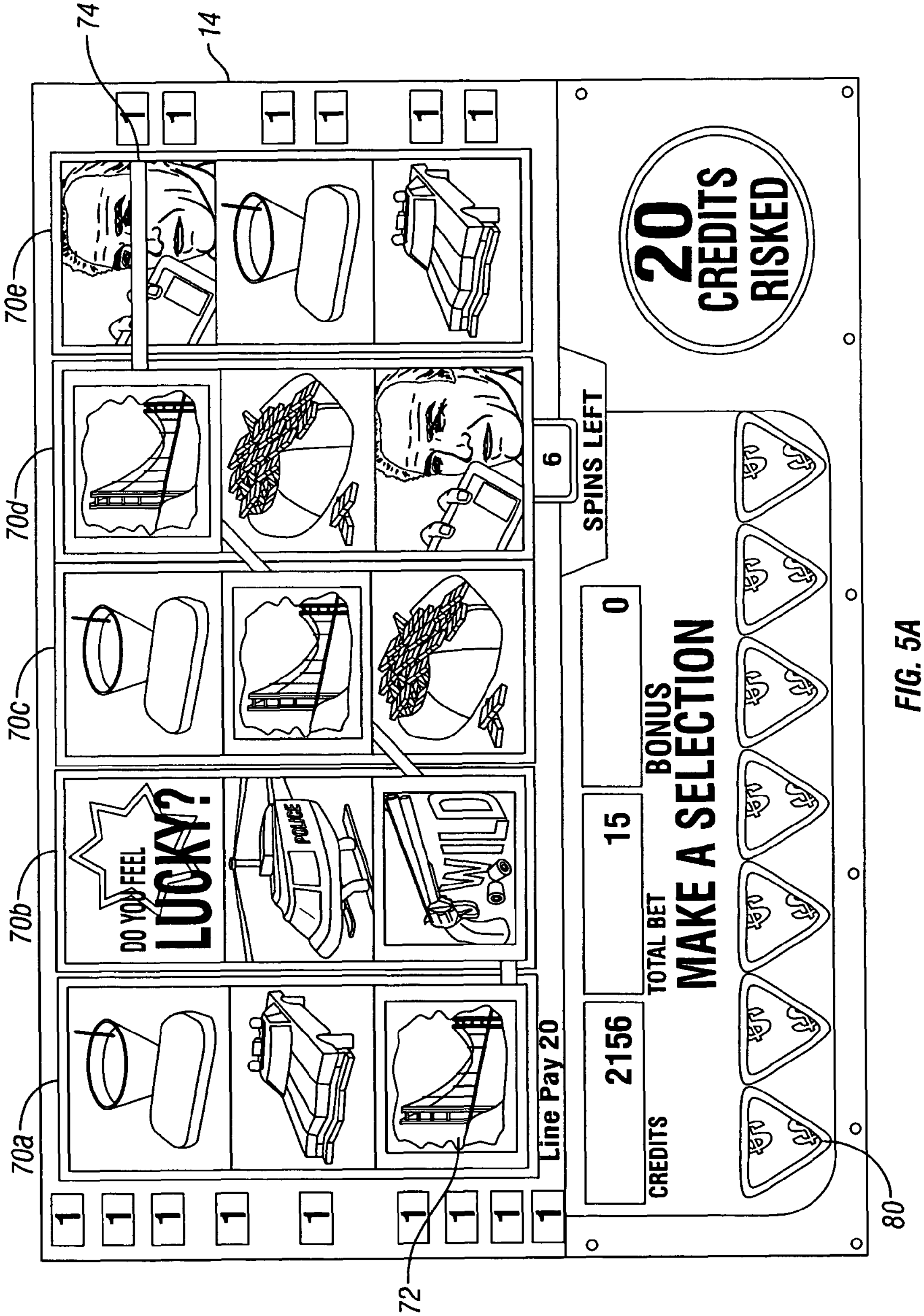
FIGS. 5A-5B illustrate an exemplary skill-based component of the bonus wagering game according to one embodiment of the invention.
Figure 5B:
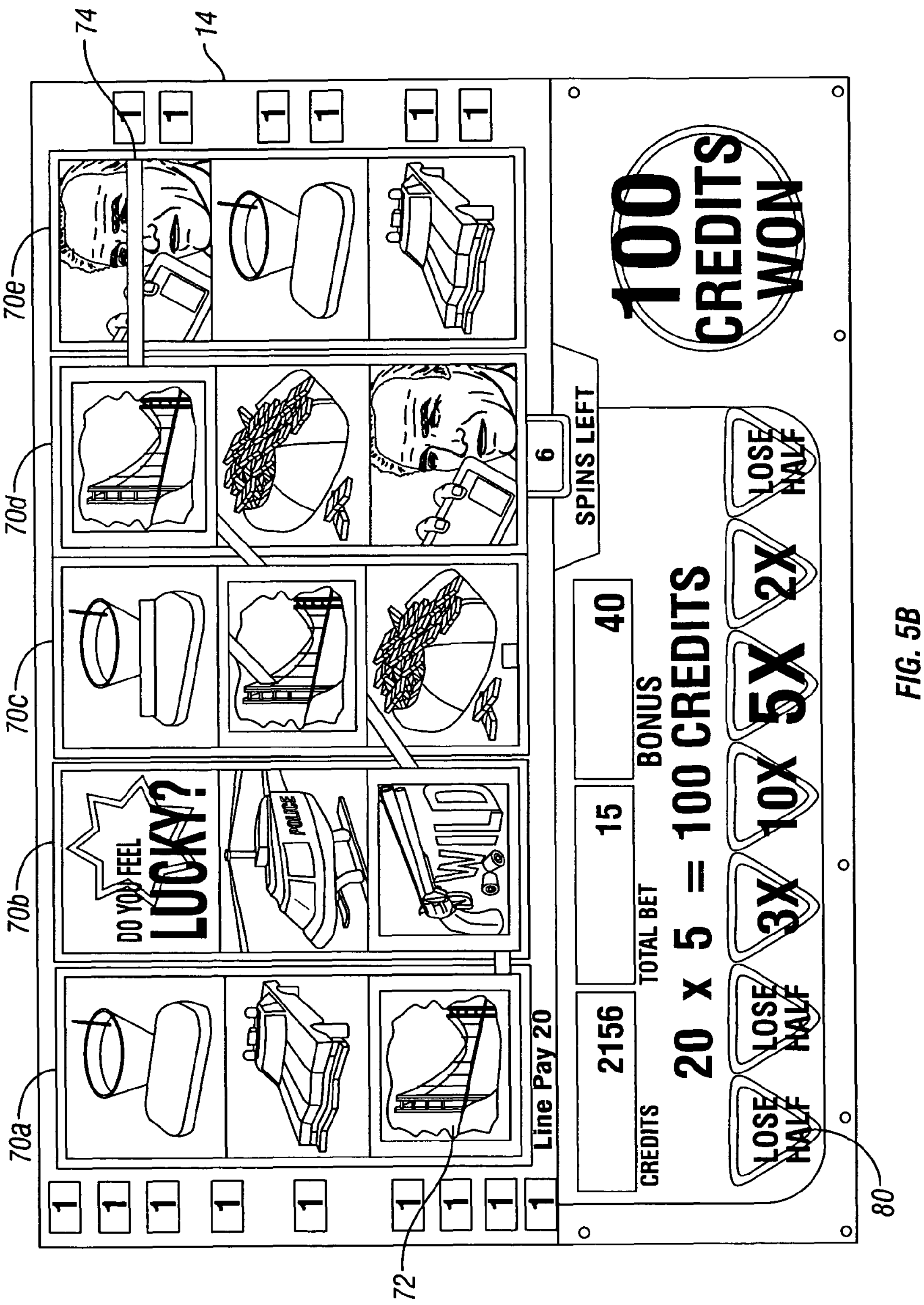

If the player chooses the "I Feel Lucky" option 78, the primary display 14 displays a plurality of multipliers 80 from which the player may select, as shown in FIG. 5A. The values of the multipliers 80 are hidden until the player selects one of them. Whichever multiplier 80 is selected, the player's winnings are multiplied by that multiplier. As can be seen in FIG. 5B, there are a total of five multipliers, ½, 2, 3, 5, and 10, with some multipliers 80 appearing more than once. Thus, the player may potentially increase his or her winnings by 2, 3, 5, or 10 fold, or the player may potentially lose half of the winnings. The average multiplier, however, is approximately 3, meaning that by selecting the "I Feel Lucky" option 78, the player will, on average, increase his or her winnings by 3 fold. Thus, the optimal strategy for this bonus wagering game is for the player to select the "I Feel Lucky" option 78 every time.

However, as mentioned above, not all players can or will use the optimal strategy, either because they lack understanding or for various other reasons. As a result, some players wind up with less than their expected share of winnings. Plus, since the winnings are already factored into the payback percentage of the gaming machine 10, the gaming machine 10 ends up generating more revenue than expected, potentially raising questions about the functionality or fairness of the gaming machine 10.

Therefore, in accordance with embodiments of the invention, a compensation bonus may be provided to compensate those players (as opposed to all players in general) at the end of the bonus wagering game. The compensation bonus, which may be implemented in many forms, compensates the player when he or she employs less-than-optimal strategy or fails to make the best decisions during the bonus wagering game. An example can be seen in FIG. 6, where the compensation bonus is implemented as an "Extra Lucky Bonus" in keeping with the "Dirty Harry" movie theme. The "Extra Lucky Bonus" is awarded to the player at the end of certain bonus wagering games where the "Take Credits" option 76 was selected. Thus, the player is compensated for the failure to select the "I Feel Lucky" option 78, which would have been a more optimum choice. An "Extra Lucky Bonus" announcement 82, which may be a visual and/or audio announcement, informs the player that he or she has been awarded the "Extra Lucky Bonus."

Since the compensation bonus is a corrective measure, it is preferably made to appear mysterious or otherwise unrelated to the bonus wagering game to prevent the player from intentionally playing for it. Thus, in one embodiment, the "Extra Lucky Bonus" is awarded periodically at random, for example, after every second, two and a half, third, three and a quarter, fourth, four and two-thirds, fifth, or other rational or irrational number of times that the "Take Credits" option 76 is selected. In another embodiment, the "Extra Lucky Bonus" may be designed with a certain probability (e.g., 25%) of being awarded any time the player makes a non-optimal selection. It is also possible to base the frequency of the "Extra Lucky Bonus" on the amount that the player missed out on due to his or her non-optimal selections. For example, if the player opted for the "Take Credits" option 76 when 2000 credits or more are at risk, then he or she will be twice as likely to receive the "Extra Lucky Bonus" than if only 1000 credits were at stake. Any difference in credits awarded between the two situations may be corrected using a multiplier, which may be twice as large for the lower probability situation. Regardless of the specific implementation, the "Extra Lucky Bonus" should be awarded in such a way that the player does not link the occurrence of the "Extra Lucky Bonus" to his or her failure to select the "I Feel Lucky" option 78.

Furthermore, instead of simply compensating the player the difference between the amount that was actually won and what he or she would have won had the "I Feel Lucky" option 78 been selected, the amount awarded may vary. The variance may be directly or indirectly related to the difference amount by some predefined scheme, such as a percentage of the difference amount, or a predetermined amount added to or subtracted from the difference amount. For example, consider a player who has won 100 credits at the end of four bonus wagering games where the "Take Credits" option 76 was selected. On average, the player would have won approximately 400 credits had he or she selected the "I Feel Lucky" option 78 instead. Rather than compensating the player the difference of 300 credits, the "Extra Lucky Bonus" may compensate the player 500 credits one time, then 100 credits another time, and so on. In this way, the player does not connect the amount of the "Extra Lucky Bonus" to his or her failure to select the "I Feel Lucky" option 78.

Note in the foregoing that the lack of optimal strategy may, but does not necessarily have to, occur in consecutive-bonus wagering games. Thus, there may be times where the player mixes optimal strategy with less-than-optimal strategy during different instances of the bonus wagering game. When that happens, only those bonus wagering games where less-than-optimal strategy was used are counted toward the "Extra Lucky Bonus."

It is of course possible to simply award the player the difference between the amount that was actually won and what he or she would have won, and/or to do so after every bonus wagering game where the optimal strategy or best decision-making was not used, without departing from the scope of the invention.

Figure 7:
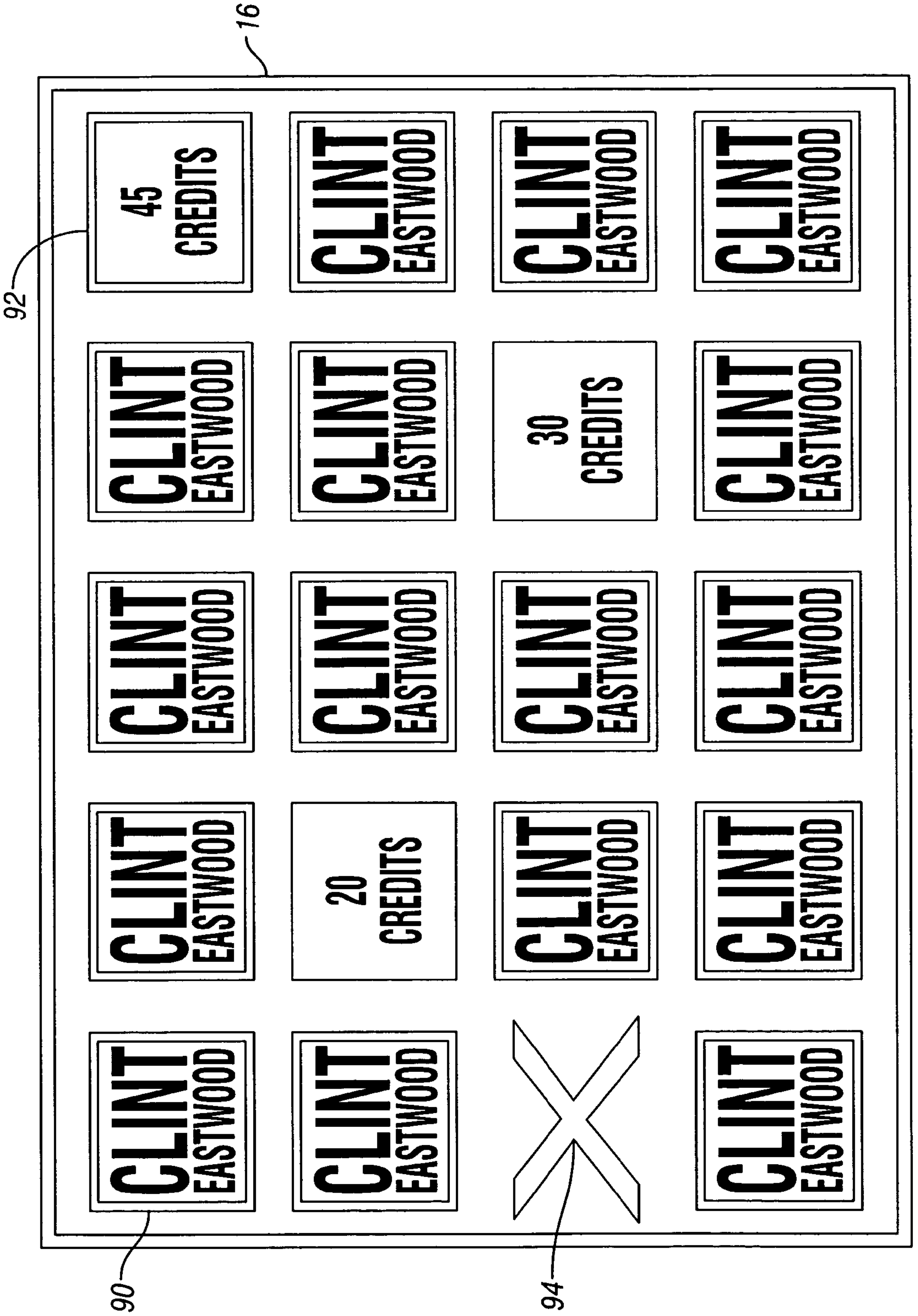
FIG. 7 illustrates another exemplary random component of the bonus wagering game according to one embodiment of the invention.

The compensation bonus may be implemented in other ways as well. For example, instead of a mysterious bonus being awarded from time to time after the end of a bonus wagering game, the compensation bonus may be implemented in the form of a player-selection game displayed on the secondary display 16, as shown in FIG. 7. The player-selection game may be awarded with substantially the same frequency as the "Extra Lucky Bonus" described above and typically includes a plurality of picks or selections 90. The picks 90 reveal either a randomly-selected credit amount 92 or a game-termination symbol 94 when selected. Compensation may then be provided by reducing the number of game-termination symbols 94 present, thus decreasing the likelihood that the player will end the game prematurely, and/or increasing the size of the credit amounts 92. In some embodiments, it is also possible to implement the player-selection game in conjunction with the "Extra Lucky Bonus" award described above.

Figure 8:
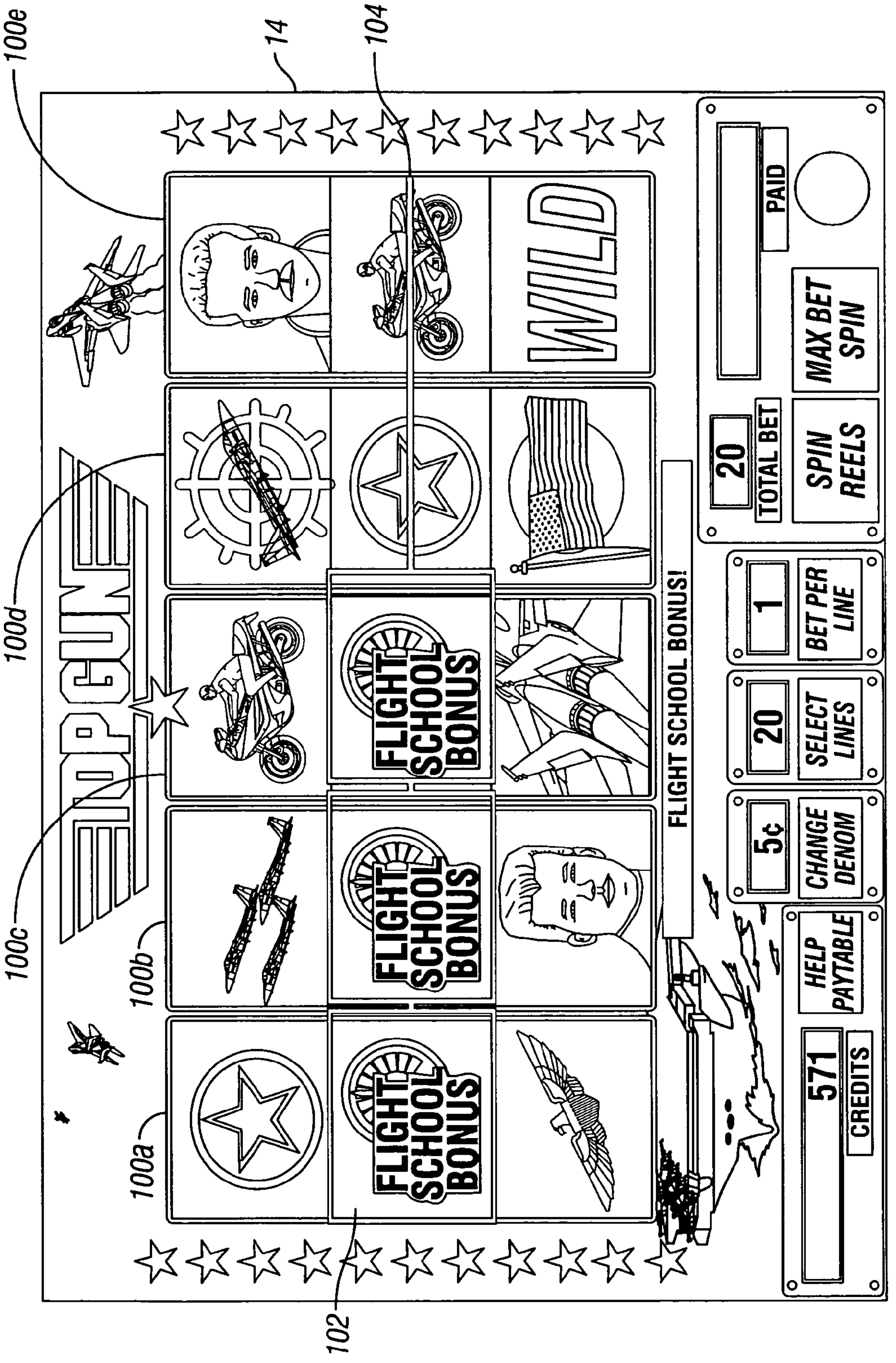
FIG. 8 illustrates another basic wagering game that may be conducted on the gaming machine.

FIGS. 8 and 9A-9C illustrate an embodiment of the invention where players are compensated for less-than-optimal hand-eye coordination and/or timing. As can be seen in FIG. 8, this embodiment is also based on a multi-line video slot machine having five reels 100*a*, 100*b*, 100*c*, and 100*e* displayed on the primary display 14, but with a "Top Gun" movie theme instead of a "Dirty Harry" movie theme. Each of the five reels 100*a-e* has a plurality of reel symbols 102 that are related to the "Top Gun" movie, including a "Flight School Bonus" symbol. Only three reel symbols 102 per reel are visible at any given time, resulting in a total of 15 symbols displayed on the primary display 14. Three or more of the "Flight School Bonus" symbols lining up on any active payline, such as the one shown at 104, constitutes a start-bonus outcome. Of course, other symbols 102 besides the "Flight School Bonus" symbol may be used for the start-bonus outcome without departing from the scope of the invention.

Figure 9A:
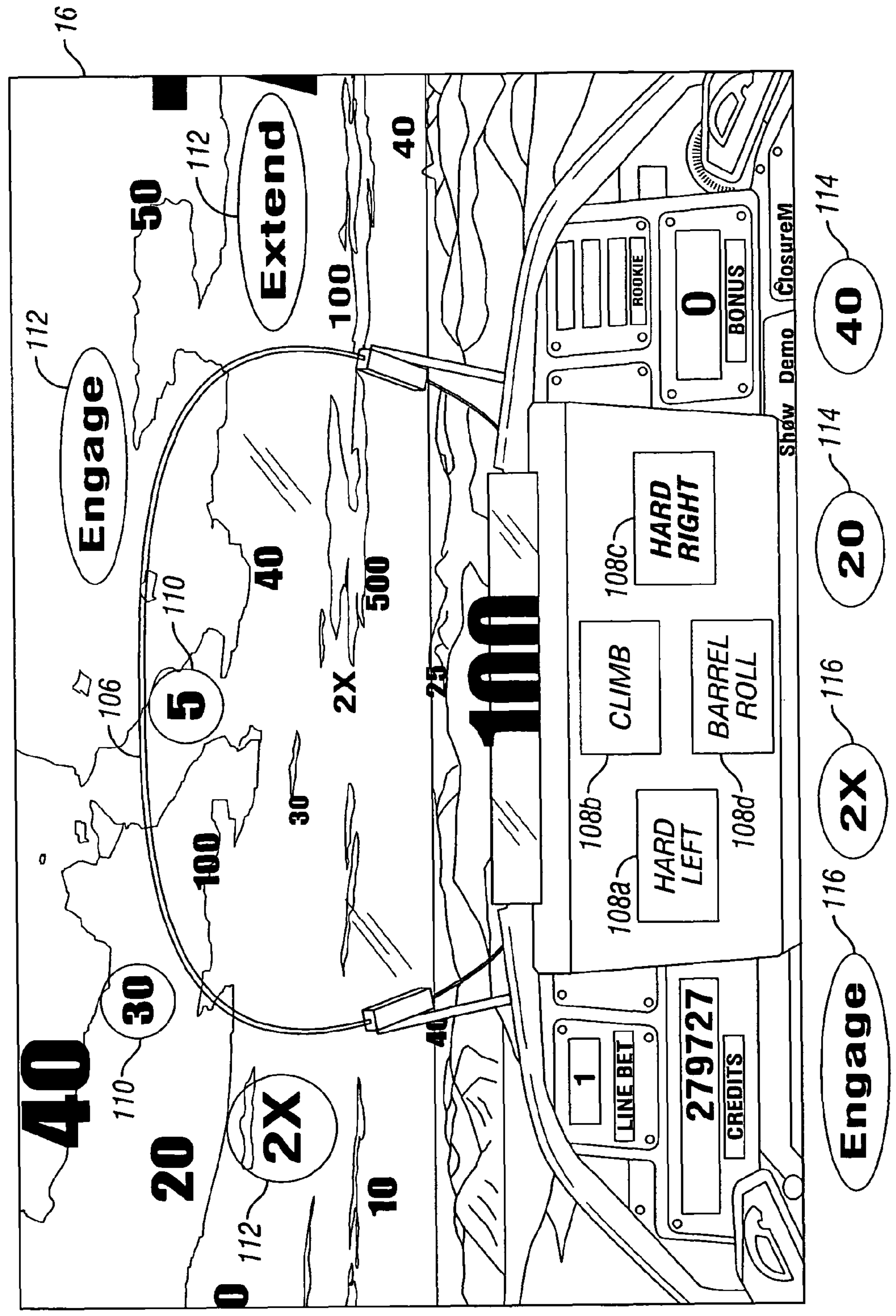
FIGS. 9A-9C illustrate another bonus wagering game conducted on the gaming machine according to one embodiment of the invention.

Upon the randomly-selected outcome being the start-bonus outcome, a bonus wagering game is displayed on the secondary display 16, as depicted in FIG. 9A. It is also possible, of course, for the bonus wagering game to be displayed on the primary display 14 instead. In this embodiment, the bonus wagering game is a flight simulation game in which the player is presented with a view as seen from the cockpit of an aircraft in mid-flight. For example, there may be a heads-up display (HUD) 106 showing readouts from various instruments superimposed over the ground below and a plurality of flight controls that control the flight of the aircraft, including a hard left control 108*a*, a climb control 108*b*, a hard right control 108*c*, and a barrel roll control 108*d*. Selecting one or more of the flight controls 108*a-d* causes the aircraft to execute an appropriate maneuver associated with the respective flight control 108*a-d* (e.g., left, climb, right, barrel roll, etc.).

In accordance with embodiments of the invention, a plurality of bonus awards, including credit awards 110 and "special" awards 112, may be shown continuously flying past the aircraft. The credit awards 110 represent credit amounts, whereas the special awards 112 represent non-credit types of awards, such as multipliers (e.g., 2×, 4×, 6×, etc.), bonus extenders (denoted here as "Extend"), and even enemy engagements (denoted here as "Engage") in which the player may win additional credit amounts by eluding enemy aircrafts. Selecting one of the flight controls 108*a-d* when one or more bonus awards 110 and 112 are on-screen results in the player being awarded one of the on-screen bonus award 110 and 112. Based on this arrangement, one or more of the on-screen bonus awards 110 and 112 will be awarded to the player only a certain percentage of the time. Indeed, for some on-screen bonus awards 110 and 112, the percentage of time may be zero.

In one embodiment, the specific on-screen bonus awards 110 and 112 are displayed and awarded in a manner such that players with good hand-eye coordination (or other skill-based abilities) have no advantage over other players. In these embodiments, players do not necessarily receive the highest bonus award 110 appearing on the display 16 (or a region thereof) when a flight control selection is made, but may instead be awarded a predetermined credit value selected from amongst the credit values displayed. In order to appear random, the range of on-screen bonus awards 110 that are displayed may vary significantly, but with larger credit values being less likely to be awarded than smaller ones. As a result, it may be difficult to maintain a particular weighted average or EV with every player for the bonus wagering game.

Therefore, in accordance with embodiments of the invention, one or more off-screen (i.e., not visible) bonus awards may be awarded from time to time to help maintain a consistent credit value awarded when averaged amongst all the on-screen bonus awards 110 and 112 appearing on the display 16. The off-screen bonus awards, like the on-screen bonus awards 110 and 112, may include both credit awards 114 and special awards 116. These off-screen credit awards 114 and special awards 116 compensate the player for any credit amounts he or she may have missed out on. Such off-screen bonus awards 114 and 116 may be awarded by themselves (e.g., as a "mystery" award) or in addition to the on-screen bonus awards 110 and 112 when the player selects one of the flight controls 108*a-d*.

Figure 9B:
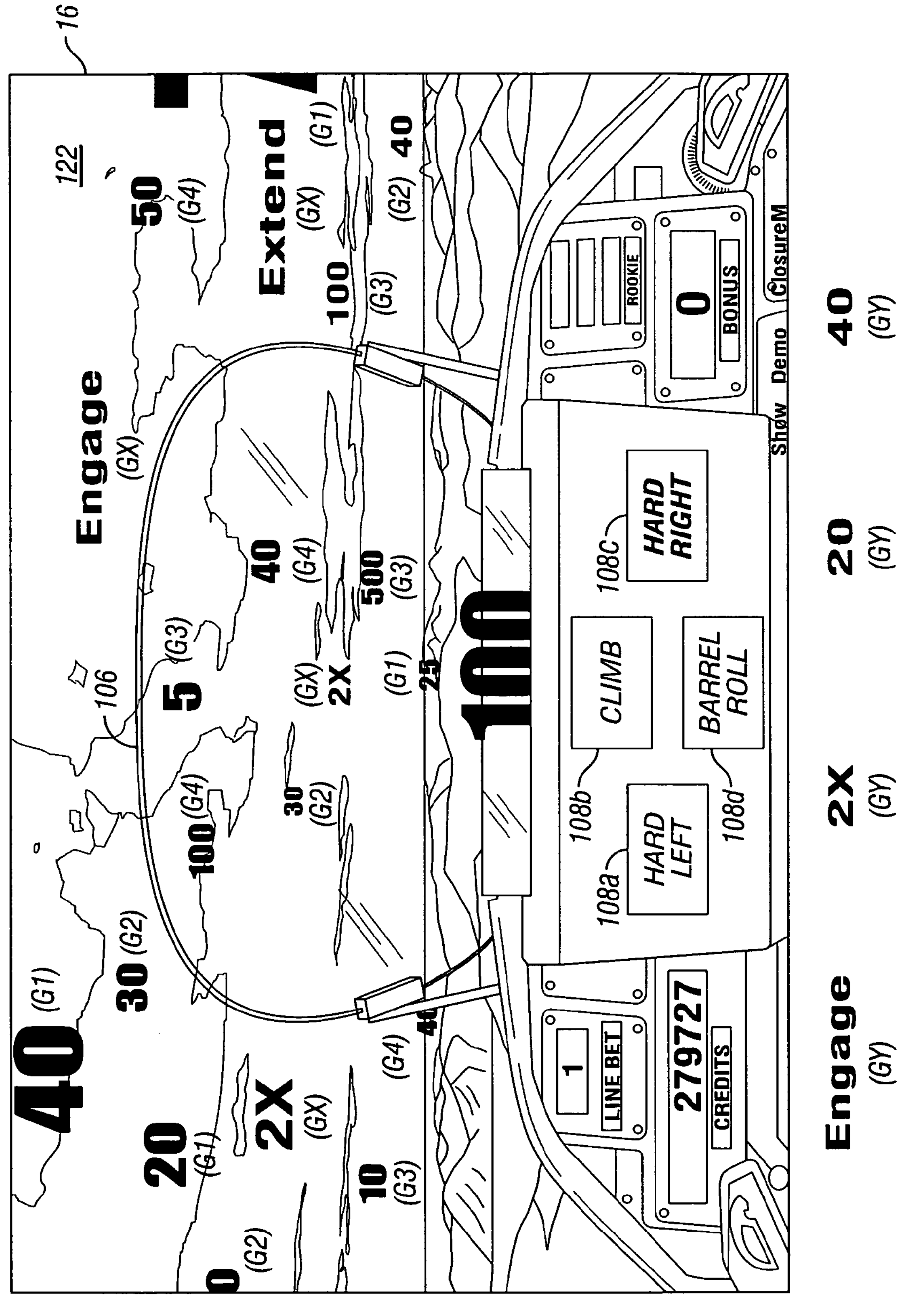

The determination of which on-screen and which off-screen bonus awards 110 and 112 and 114 and 116 to use at any given time may be implemented in many ways. In one embodiment, the on-screen bonus awards 110 and 112 may be selected by one or more "bonus award generators" or other functional components, as illustrated in FIG. 9B. These bonus award generators operate on substantially the same principal as random number generators and, therefore, their operation will not be described here. Each bonus award generator is denoted in parentheses underneath its respective on-screen and off-screen bonus awards 110-116 in FIG. 9B.

For the on-screen bonus awards 110 and 112, there are two types of bonus award generators, credit award generators G1, G2, G3, and G4 that generate the on-screen credit awards 110, and special award generators GX that generate the on-screen special awards 112. When an on-screen bonus award 110 and 112 is awarded or otherwise moved off the display 16, the bonus award generator G1-G4 and GX that generated that on-screen bonus award 110 and 112 selects another on-screen bonus award 110 and 112 from its set of available bonus awards 110 and 112 for placement on-screen. Special award generators GX typically share the same set of possible on-screen special awards 112. However, the set of possible on-screen credit awards 110 that may be generated by each credit award generator G1-G4 may be uniquely distinct, or two or more credit award generators G1-G4 may share at least one possible on-screen credit award 110.

For the off-screen bonus awards 114 and 116, an off-screen bonus award generator GY generates both the off-screen credit awards 114 and the off-screen special awards 116. In one embodiment, the bonus award generator GY generates the off-screen bonus awards 114 and 116 by randomly selecting them from an off-screen bonus award table. In accordance with embodiments of the invention, the off-screen bonus awards 114 and 116 contained in the table may be weighted to create a targeted net expected value ("EV"). The targeted net EV may be the same from flight control 108*a-d* selection to flight control 108*a-d* selection, or it may vary from flight control selection to flight control selection. In the latter case, there may be a plurality of net EVs, each net EV being associated with its own respective weighted table. One of the plurality of net EVs may then be assigned when a player makes a flight control selection. Alternatively, the off-screen bonus awards 114 and 116 may be weighted so that their distribution does not change regardless of which on-screen bonus awards 110 and 112 are displayed on the display 16. As in the case of the net EVs, there may also be a plurality of distributions of off-screen bonus awards 114 and 116, each distribution being associated with its own respective weighted table.

An example of a weighted table that may be used specifically for the off-screen credit awards 114 is shown at TABLE 1. A similar table may be used for the off-screen special awards 116 and, therefore, that table will not be described here. In TABLE 1, the row labeled "Value" lists the possible credit amounts that may be awarded as an off-screen credit award 114, and the row labeled "Weight" lists the weights associated with each value. As can be seen, the first and second credit amounts, 10 and 15, have identical probabilities of being awarded based on their weight, whereas the third credit amount, 20, is more than twice as likely to be awarded. In contrast, the next-to-last credit amount, 500, has a comparatively small chance of being awarded. The weights are chosen so that the probability of being awarded any particular credit amount for a given flight control selection does not change regardless of which on-screen bonus awards 110 and 112 are currently displayed on the display 16. Alternatively, the weights may be chosen so that the EV for any given flight control selection does not change regardless of which on-screen bonus awards 110 and 112 are currently displayed on the display 16.

TABLE 1

| | Value | | | | | | | | | | | | | |
|---|---|---|---|---|---|---|---|---|---|---|---|---|---|---|
| | 10 | 15 | 20 | 25 | 30 | 40 | 50 | 60 | 75 | 100 | 200 | 250 | 500 | 1000 |
| Weight | 305 | 305 | 655 | 330 | 350 | 655 | 655 | 305 | 305 | 295 | 290 | 290 | 15 | 290 |

The weighted table, in turn, may be chosen from a plurality of weighted tables. In one embodiment, selection of the specific weighted table may be based on the bonus awards 110 and 112 that are on-screen at the time the player selects one of the flight controls 108*a-d*. The particular on-screen bonus awards 110 and 112 that are considered in the selection process may include all of the on-screen bonus awards 110 and 112 appearing on the display 16, or they may include only some of the on-screen bonus awards 110 and 112 appearing on the display 16. Each set of on-screen bonus awards 110 and 112 used may be completely distinct from the other sets, or two or more sets may share all or some of their on-screen bonus awards 110 and 112. Or there may be no on-screen bonus awards 110 and 112 used at all (i.e., the weighted table is chosen via some other criteria) based on a particular flight control selection.

In one embodiment, the particular on-screen bonus awards 110 and 112 used in the selection of a specific weighted table are grouped according to the region of the display 16 into which the aircraft maneuvers. This can be seen in FIG. 9C, where the display 16 is divided into a number of regions, for example, a left region 118*a*, a top region 118*b*, a right region 118*c*, and a middle region 118*d* (as shown by the dashed lines). Each region 118*a-d* corresponds to one flight control 108*a-d*, for example, the left region 118*a* and the hard left flight control 108*a*, the top region 118*b* and the climb flight control 108*b*, the right region 118*c* and the hard right flight control 108*c*, and the middle region 118*d* and the barrel flight control 108*d*. Displayed within each region is at least one, and preferably only one, on-screen bonus award 110 and 112 from every on-screen bonus award generator G1-G4 and GX. Each type of on-screen bonus award 110 and 112 within each region 118*a-d* may be generated by the same on-screen bonus award generator (i.e., a single special award generator GX generates the special bonus awards 112 for every region 118*a-d*), but preferably each region 118*a-d* has its own set of bonus award generators G1-G4 and GX.

In addition, each flight control 108*a-d* is randomly seeded with one of the on-screen or off-screen bonus award generators G1-G4, GX, and GY either before the player selects a flight control 108*a-d* or at the time of the selection. In the example shown, the hard left flight control 108*a* is seeded with a special award generator GX, the climb and barrel flight controls 108*b* and 108*d* are seed with credit award generators G3 and G1, and the hard right flight control 108*c* is seeded with an off-screen bonus award generator GY. These seedings may change after each flight control selection, or they may remain the same for multiple flight control selections. When the player selects one of the flight controls 108*a-d*, the aircraft "maneuvers" into the region 118*a-d* corresponding to the selected flight control 108*a-d*, and the player is awarded one of the on-screen or off-screen bonus awards 112-116 associated with that region, depending on the bonus award generator G1-G4, GX, or GY assigned to the selected flight control 108*a-d*.

If the selected flight control 108*a-d* is seeded with one of the on-screen bonus award generators G1-G4, or GX, then the player is awarded the on-screen bonus award 110 or 112 appearing in that region and generated by that bonus award generator. On the other hand, if the selected flight control 108*a-d* is seeded with an off-screen bonus award generator GY, then a decision is made whether to award an off-screen credit award 114 or an off-screen special award 116. In some embodiments, the probability of receiving either one is the same, but in other embodiments, one may have a higher probability of being awarded than the other. Thereafter, the on-screen bonus awards 110 and 112 appearing in the selected region 118*a-d*, but not the other regions, are used to select the weighted table for the off-screen bonus award generator GY. The selection may be accomplished, for example, by using a look-up table to match the on-screen bonus awards 110 and 112 appearing in that region 118*a-d* to one of a plurality of available weighted tables. The specific off-screen bonus award 114 or 116 may then be chosen from the weighted table.

It is also possible to choose the weighted table based solely on the flight control 108*a-d* that the player selects. Thus, for example, if the player selects the hard left flight control 108*a*, one set of on-screen bonus awards 110 and 112 is used to choose the table, whereas if the player selects the hard right flight control 108*d*, another set of on-screen bonus awards 110 and 112 is used.

When on-screen bonus award 110 and 112 has been awarded or otherwise moved off the screen, it may be replaced. In some embodiments, the replacement may be one of the off-screen bonus awards 114 and 116. For example, the new on-screen bonus awards 110 and 112 may be selected from the weighted tables discussed above (see TABLE 1). The particular weighted table used may be the same as the one used for current flight control selection, or it may be a different weighted table. And the replacement may occur before a player makes a flight control selection, or it may occur after the player makes the flight control selection. Other aspects of the invention involve using the entire set of possible bonus awards (i.e., on-screen and off-screen) to select the replacement for the on-screen bonus award 110 and 112, or only a subset of the entire set (including an empty set, in which case the bonus award 110 and 112 that was removed is simply placed back on-screen).

Although the foregoing embodiments describe the bonus award 110 and 112 as being displayed and awarded randomly, it is also possible to award the credit value closest to the aircraft when selection of a flight control 108*a-d* is made. Thus, for example, selecting the hard left flight control 108*a* awards the player the largest on-screen bonus award 110 and 112 located on that region 118*a* of the display 16, selecting the hard right flight control 108*c* awards the largest on-screen bonus award 110 and 112 located on the right region 118*c*, and so forth. In still other embodiments, the player must actually maneuver the aircraft through the on-screen bonus award 110 and 112 in order to receive that award.

In the above embodiments, players ideally will time their flight control 108*a-d* selections to coincide with the appearance and location of the on-screen bonus awards 110 and 112 having the highest values. However, some players have poor timing and/or hand-eye coordination, or simply do not perform well in these types of activities for various reasons. As a result, the gaming machine may retain more than its expected share of revenue, potentially discouraging players and causing problems for casino operators. Therefore, in accordance with embodiments of the invention, a compensation bonus may be awarded to the player for the lack of hand-eye coordination. The compensation bonus may be awarded in the form of a mystery bonus, similar to the "Extra Lucky Bonus" (see FIG. 6), or as a player-selection game (see FIG. 7), and may have substantially the same frequency as those compensation bonuses.

Still other ways of implementing the compensation bonus may be used without departing from the scope of the invention. For example, some bonus wagering games may have multiple rounds of skill-based decisions. In one embodiment, such a bonus wagering game may increase the potential credit award and/or the likelihood of winning after each skill-based round to compensate for a lack of optimal play in the previous skill-based round. The final round may then require minimal skill or be entirely random, or no compensation is provided if the difference amount is small enough.

Figure 6:
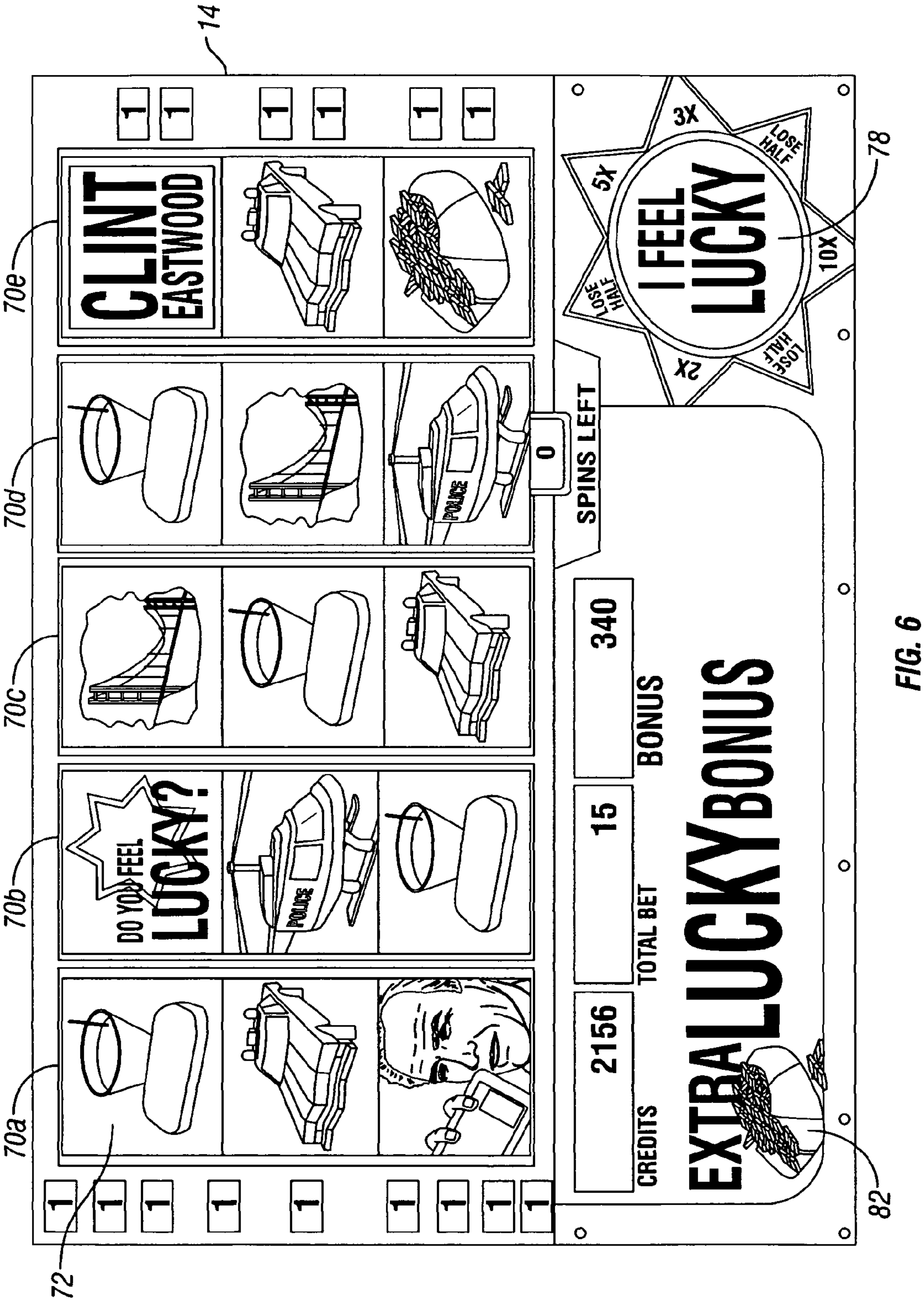
FIG. 6 illustrates an exemplary random component of the bonus wagering game according to one embodiment of the invention.
Figure 9C:
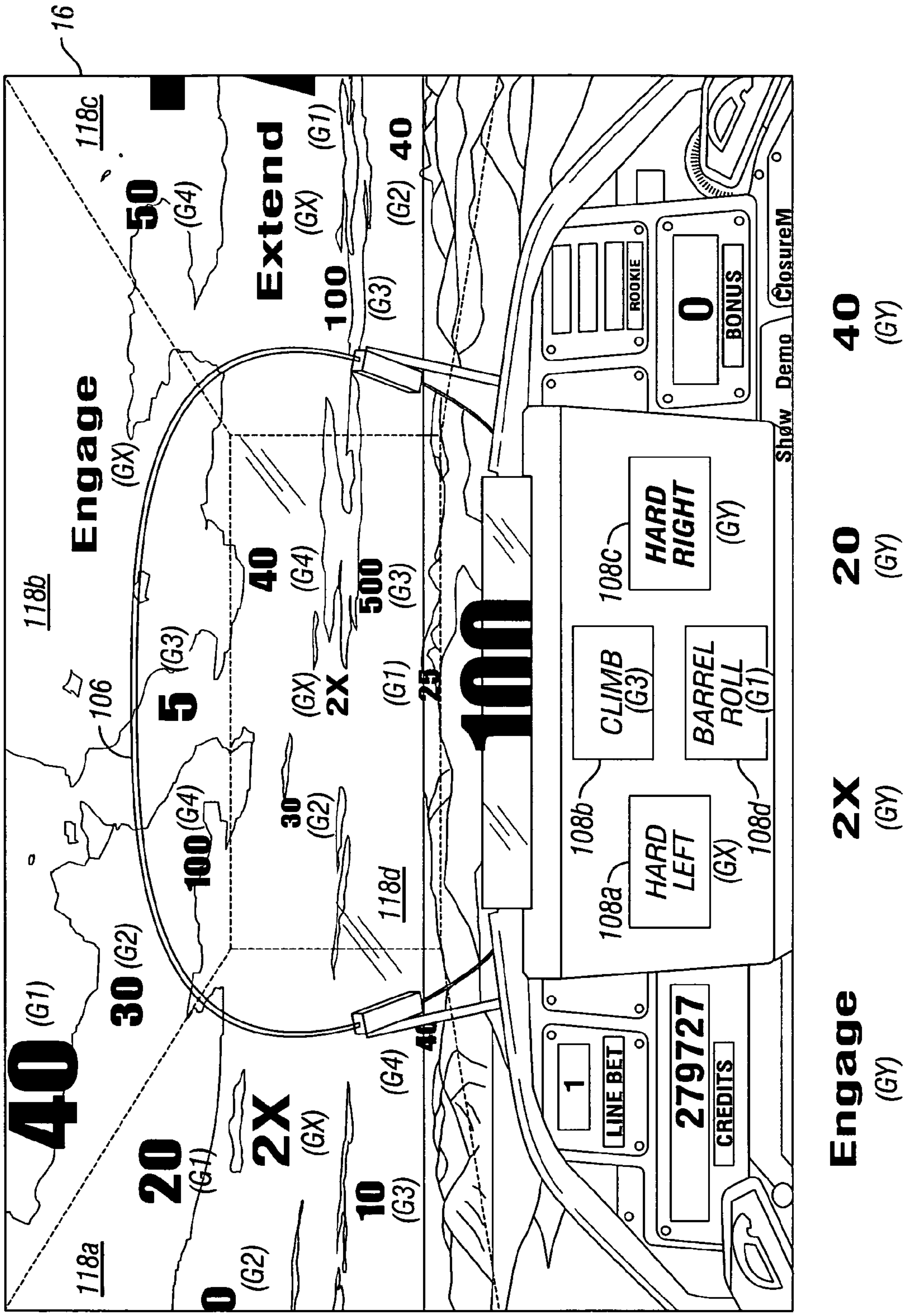

In general, embodiments of the invention may be implemented in the form of a bonus wagering game that includes a skill-based component, such as the "I Feel Lucky" multiplier option 78 and of FIGS. 4 and 5A-5B (and, in some embodiments, the mid-air maneuvers of FIGS. 9A-9C), and a random component where no skill is involved, such as the "Extra Lucky Bonus" of FIG. 6 and the player-selection game of FIG. 7 (which random components may also be applied to the mid-air maneuvers of FIGS. 9A-9C). The skill-based component may be any aspect of the bonus wagering game that relies on strategy, the player's experiences, or requires hand-eye coordination. The gaming machine then uses the random component of the bonus wagering game to add higher credit values to the possible awards, or to increase the probability of the player achieving an award, to thereby compensate the player for his or her lack of optimal play during the skill-based component.

Other skill-based components and/or random components may also be used as well. For example, in some embodiments, instead of a multiplier option, a "Pong" game may be used as the skill-based component. Moreover, the skill-based component and the random component may have more than two levels of skills and compensation. For example, the skill-based component may present the player with three or more choices, including a best choice, a mediocre choice, and a bad choice. The compensation component may then compensate the player according to his or her selection, including no compensation for the best choice, an intermediate credit amount for the mediocre choice, and a maximum credit amount for the bad choice.

Each of these embodiments and obvious variations thereof is contemplated as falling within the spirit and scope of the claimed invention, which is set forth in the following claims.

What is claimed is:

1. A gaming machine comprising:

a value input device for accepting a wager from a player at the gaming machine;

a display unit for displaying a wagering game on the gaming machine, the wagering game having an optimal strategy and at least one non-optimal strategy, an optimal expected value corresponding to the optimal strategy and a non-optimal expected value corresponding to the at least one non-optimal strategy, the wagering game having a targeted expected value for an average of awards provided over a period of time, the targeted expected value being substantially equal to the optimal expected value;

at least one processor for determining, in response to the player selecting one of the at least one non-optimal strategies, a difference in expected value between the optimal strategy and the selected non-optimal strategy; and at least one memory for storing the difference in expected value between the optimal strategy and non-optimal strategies selected by the player, wherein in response to a player selecting one of the at least one non-optimal strategy, the at least one processor to award an additional variable non-progressive award over one or more subsequent events on the gaming machine, the at least one processor variably selecting the additional award from a plurality of possible awards for the selected non-optimal strategy, the plurality of possible awards being based on the difference, the additional award causing the average of awards provided by the gaming machine over the period of time to approach at least partially the targeted expected value, wherein the display unit does not display, to the player, any information relating to the additional award at the time that the player selects the optimal strategy, and wherein the display unit does not display, to the player, any information relating to the additional award at the time that the player selects the non-optimal strategy.

2. The gaming machine according to claim 1, wherein the additional award is determined without regard to the actual award provided to the player for selecting the one non-optimal strategy.

3. The gaming machine according to claim 1, wherein the at least one processor further determines the additional award randomly .

4. The gaming machine according to claim 1, wherein the at least one processor further determines the additional award from a weighted table.

5. The gaming machine according to claim 1, wherein the at least one processor further determines the additional award according to the selected non-optimal strategy.

6. The gaming machine of claim 1, wherein the at least one processor further awards the additional award over more than one subsequent event, the additional award including a plurality of varying awards.

7. The gaming machine of claim 1, wherein the at least one processor further awards the additional award over more than one subsequent event, and the number of events between awards varies.

8. A method of conducting a wagering game on a gaming machine, the method comprising:

accepting a wager input from a player at the gaming machine, the wager input initiating a wagering game;

displaying, on the gaming machine, the wagering game, the wagering game having an optimal strategy and at least one non-optimal strategy, an optimal expected value corresponding to the optimal strategy and a non-optimal expected value corresponding to the at least one non-optimal strategy, the wagering game having a targeted expected value for an average of awards provided over a period of time, the targeted expected value being substantially equal to the optimal expected value;

determining, with at least one processor, in response to the player selecting one of the at least one non-optimal strategies, a difference in expected value between the optimal strategy and the selected non-optimal strategy;

storing, with at least one memory, the difference in expected value between the optimal strategy and non-optimal strategies selected by the player; and awarding, with the at least one processor, in response to a player selecting one of the at least one non-optimal strategy, an additional variable non-progressive award over one or more subsequent events on the gaming machine, the at least one processor variably selecting the additional award from a plurality of possible awards for the selected non-optimal strategy, the plurality of possible awards being based on the difference, the additional award causing the average of awards provided by the gaming machine over the period of time to approach at least partially the targeted expected value, wherein the gaming machine does not display, to the player, any information relating to the additional award at the time that the player selects the optimal strategy, and wherein the display unit does not display, to the player, any information relating to the additional award at the time that the player selects the non-optimal strategy.

9. The method according to claim 8, further comprising determining, with the at least one processor, the additional award without regard to the actual award provided to the player for selecting the one non-optimal strategy.

10. The method according to claim 8, further comprising determining, with the at least one processor, the additional award randomly.

11. The method according to claim 8, further comprising determining, with the at least one processor, the additional award from a weighted table.

12. The method according to claim 8, further comprising determining, with the at least one processor, the additional award according to the selected non-optimal strategy.

13. The method according to claim 8, further comprising awarding the additional award over more than one subsequent event, wherein the additional award includes a plurality of awards having varying values.

14. The method according to claim 8, further comprising awarding the additional award over more than one subsequent event, wherein the number of events between awards varies.

15. The gaming machine according to claim 1, wherein the at least one processor is configured to award the additional award at any of a plurality of times, the at least one processor awards randomly selecting a time from the plurality of times and awarding the additional award at the randomly selected time.

16. The method according to claim 8, wherein the at least one processor is configured to award the additional award at any of a plurality of times, the method further comprising randomly selecting, with the at least one processor, a time from the plurality of times and awarding the additional award at the randomly selected time.

* * * * *